(12) United States Patent
Dubettier-Grenier et al.

(10) Patent No.: US 9,453,645 B2
(45) Date of Patent: Sep. 27, 2016

(54) PROCESS FOR PROVIDING AN OXYGEN RICH GAS AND FUEL TO AT LEAST TWO OXYGEN RICH GAS CONSUMING UNITS

(71) Applicants: L'Air Liquide, Societe Anonyme pour l'Etude et l'Exploitation des Procedes Georges Claude, Paris (FR); BABCOCK AND WILCOX POWER GENERATION GROUP, INC., Barberton, OH (US)

(72) Inventors: Richard Dubettier-Grenier, Saint Hilaire (FR); Alain Guillard, Paris (FR); Dennis McDonald, Massillon, OH (US); Sebastien De Limon, Paris (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 33 days.

(21) Appl. No.: 14/426,322

(22) PCT Filed: Aug. 28, 2013

(86) PCT No.: PCT/EP2013/067755
§ 371 (c)(1),
(2) Date: Mar. 5, 2015

(87) PCT Pub. No.: WO2014/037250
PCT Pub. Date: Mar. 13, 2014

(65) Prior Publication Data
US 2015/0226428 A1   Aug. 13, 2015

(30) Foreign Application Priority Data

Sep. 5, 2012  (EP) .................................. 12306059

(51) Int. Cl.
*F23L 7/00* (2006.01)
*F23J 3/04* (2006.01)
(Continued)

(52) U.S. Cl.
CPC ............. *F23L 7/007* (2013.01); *B01D 53/005* (2013.01); *F25J 3/04533* (2013.01);
(Continued)

(58) Field of Classification Search
CPC .. B01D 53/00; B01D 53/002; B01D 53/005; F23L 7/007; F23L 2900/07001; F23L 2900/07006; F25J 3/04533; F25J 3/04545; F25J 3/04812; Y02E 20/322; Y02E 20/344
USPC .................. 95/96; 62/640, 617; 60/643, 652
See application file for complete search history.

(56) References Cited

U.S. PATENT DOCUMENTS

| 6,568,185 B1 | 5/2003 | Marin et al. |
| 8,105,403 B2 * | 1/2012 | Regnery .................. C10G 2/32 |
| | | 252/373 |
| 2014/0020426 A1 * | 1/2014 | Nold ..................... F25J 3/04527 |
| | | 62/640 |

FOREIGN PATENT DOCUMENTS

| EP | 1 992 876 | 11/2008 |
| WO | WO 01 75277 | 10/2001 |

OTHER PUBLICATIONS

International Search Report for PCT/EP2013/067755, mailed Oct. 14, 2013.
(Continued)

*Primary Examiner* — Frank Lawrence
(74) *Attorney, Agent, or Firm* — Justin K. Murray

(57) ABSTRACT

The process can include, during a first and second period of time, sending a first stream of oxygen rich gas from an ASU to a first oxygen consuming unit, the first unit being integrated with a system for the generation of electricity, during the first period of time, sending a second stream of oxygen rich gas from the ASU to a second unit, the second unit being a combustion unit, a first stream of air being supplied to the combustion unit during the first period, removing a second $CO_2$ containing gas from the second unit without sending any of the second $CO_2$ containing gas back to the second unit and during the second period of time, sending no oxygen rich gas from the ASU to the second unit without sending any of the third $CO_2$ containing gas back to the second unit.

15 Claims, 1 Drawing Sheet

(51) Int. Cl.
    *F25J 3/04*     (2006.01)
    *B01D 53/00*     (2006.01)

(52) U.S. Cl.
    CPC ....... *F25J 3/04545* (2013.01); *F25J 3/04812* (2013.01); *F23L 2900/07001* (2013.01); *F23L 2900/07006* (2013.01); *Y02E 20/322* (2013.01); *Y02E 20/344* (2013.01)

(56) References Cited

OTHER PUBLICATIONS

Shao, et al., "Power plants with CO2 capture using integrated air separation and flue gas recycling," Energy Conversion and Management, Elsevier Science Publishers, Oxford, GB, vol. 37, No. 6, Jun. 8, 1996, pp. 903-908.

\* cited by examiner

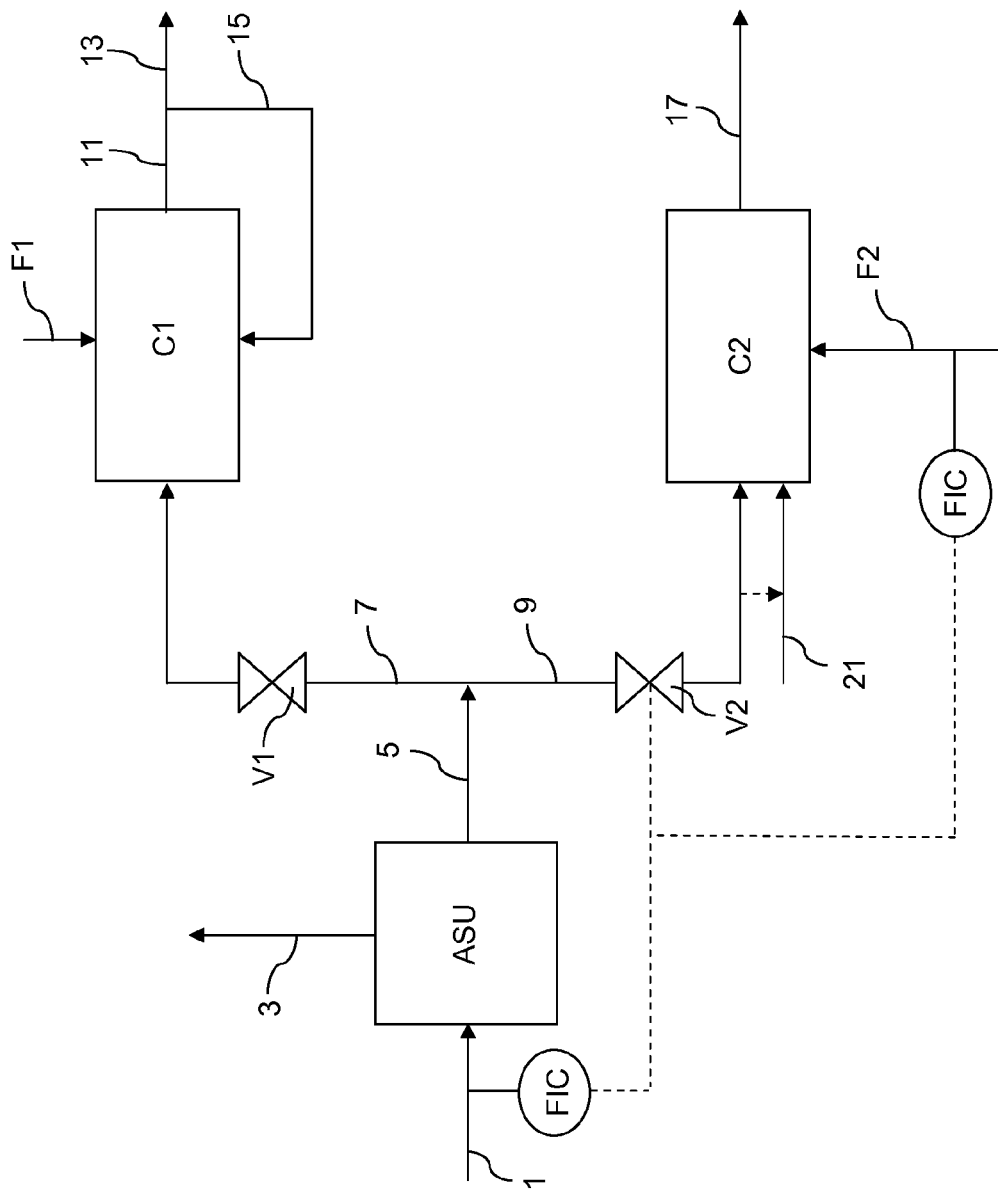

PROCESS FOR PROVIDING AN OXYGEN RICH GAS AND FUEL TO AT LEAST TWO OXYGEN RICH GAS CONSUMING UNITS

CROSS REFERENCE TO RELATED APPLICATIONS

This application is a §371 of International PCT Application PCT/EP2013/067755, filed Aug. 28, 2013, which claims the benefit of EP12306059.2, filed Sep. 5, 2012, both of which are herein incorporated by reference in their entireties.

TECHNICAL FIELD OF THE INVENTION

This invention relates to a process for providing an oxygen rich gas and fuel to at least two oxygen rich gas consuming units.

Oxygen rich gas in this context means a gas produced by the separation of air and containing at least 75% mol. oxygen, preferably at least 80% mol. oxygen. The rest of the gas contains mainly nitrogen. The separation of the air is preferably carried out by cryogenic distillation.

BACKGROUND

It is known from EP-A-1992876 to feed a boiler selectively with air or an oxygen rich gas. The boiler is supplied with fuel, which may be biomass fuel or a fossil fuel such as coal or natural gas. The boiler may for example be of the pulverized fuel (known for coal as PC) or fluidized bed or the cyclone type.

The advantages of combustion in a boiler fed with oxygen rich gas include:
- improved combustion, especially when the fuel has a reduced calorific value,
- improved thermal efficiency of the boiler due to reduced heat loss in the flue gas,
- higher flame temperature, allowing the exchange surface to produce more steam,
- reduced NOx emissions (as described in U.S. Pat. No. 6,568,185),
- improved throughput for the boiler.

However, oxygen enriched gas is not generally sent to boilers because of the cost of the oxygen rich gas.

It is; however, well known to send oxygen rich gas to a unit consuming oxygen rich gas in large quantities, the unit being for example integrated in a unit for the generation of electricity. For example, an oxycombustion boiler is generally fed with oxygen rich gas and fuel. The combustion is used to produce heat which in turn raises steam to be used in a steam turbine to generate electricity. This type of unit produces a carbon dioxide containing waste gas which is at least in part recycled to the unit, possibly after treatment. The first unit may also for example be an IGCC unit or a gasification unit, such as a coal gasification unit.

SUMMARY OF THE INVENTION

Since the air separation unit is necessary to provide an oxygen rich gas for this first unit, in many cases, it may be interesting to use part of the oxygen rich gas, at least from time to time, in a second unit, which is a combustion unit in which the oxidant used is normally air, which has not been enriched with oxygen. The associated advantages may even justify an increase in the size of the air separation unit.

According to the invention, there is provided a process for providing an oxygen rich gas and fuel to at least first and second units, both of which are oxygen rich gas consuming units comprising:

i) separating air in an air separation unit to produce oxygen rich gas.

ii) during a first and a second period of time, sending a first stream of oxygen rich gas from the air separation unit to the first oxygen rich gas consuming unit, sending a first stream of fuel to the first unit, removing a first carbon dioxide containing gas from the first unit, the first unit being integrated with a system for the generation of electricity and optionally sending at least part of the first carbon dioxide containing gas or a gas derived therefrom back to the first unit.

iii) during the first period of time, sending a second stream of oxygen rich gas from the air separation unit to the second oxygen rich gas consuming unit, the second unit being a combustion unit, at least a second stream of fuel and a first stream of air being supplied to the combustion unit during the first period, removing a second carbon dioxide containing gas from the second unit without sending any of the second carbon dioxide containing gas or any gas derived therefrom back to the second unit.

iv) during the second period of time, supplying at least a second stream of air and a third stream of fuel to the combustion during the second period and removing a third carbon dioxide containing gas from the second unit without sending any of the third carbon dioxide containing gas back to the second unit characterized in that during the second period of time, no oxygen rich gas is sent from the air separation to the second unit or a third stream of oxygen rich gas at least 50% less than the second stream is sent from the air separation to the second unit.

According to other alternative features, the process may include the following steps or features:
- a first stream of air is supplied to the second unit during the first period and a second stream of air is supplied to the second unit during the second period, the first stream being at least 50% less than the second stream.
- where the first unit is an oxycombustion unit, sending at least part of the first carbon dioxide containing gas or a gas derived therefrom back to the first unit.
- where the first unit is an IGCC unit, not sending at least part of the first carbon dioxide containing gas or a gas derived therefrom back to the first unit.
- where the first unit is a gasification unit, not sending at least part of the first carbon dioxide containing gas or a gas derived therefrom back to the first unit
- the first stream is greater than the second stream, preferably at least three times greater than the second stream.
- during the first period, the second stream of oxygen enriched gas is mixed with air to be supplied to the combustion unit or sent directly to the second unit without having been mixed with air being supplied to the combustion unit.
- the first period corresponds to a period when there is a partial interruption to the sending of air to the second unit.
- during the first period, the average price of electricity is above a given threshold and during the second period, the average price of electricity is below a given threshold.
- during the first period, the combustion unit operates with a fuel having a lower heating value below a given threshold and during the second period, the combustion unit operates with a fuel having a lower heating value above the given threshold.

during the first period, the combustion unit operates with fuel having a biomass content above a given threshold and during the second period, the combustion unit operates with fuel having a biomass content below a given threshold.

the air separation unit receives a feed flow of compressed, cooled and purified air to be distilled and during the first period, the air separation unit is operating with a feed flow below a given threshold and during the second period, the air separation unit is operating with a feed flow below the given threshold.

the second stream of fuel is greater than the third stream of fuel.

the first stream of air and the second stream of oxygen rich gas have purities and flowrates such that the oxygen purity in a gas formed by mixing the first stream of air and the second stream of oxygen rich gas would be between 21% and 40% mol. on a dry basis.

the flowrate of the first stream of oxygen rich gas during the first and second periods is at least twice that of the second stream of oxygen rich gas during the first period.

the first carbon dioxide containing gas contains at least 70%. carbon dioxide on a dry basis and the second carbon dioxide containing gas contains at most 30% carbon dioxide on a dry basis.

the air separation unit produces and stores oxygen enriched liquid during second period and wherein at least part of said oxygen enriched liquid stored during the second period is vaporized during the first period to produce at least part of the second stream of oxygen rich gas.

the first unit is not fed by air.

A number of cases in which this interrupted supply of oxygen rich gas to the second unit may be beneficial will be described.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

The FIGURE provides an embodiment of the present invention.

DETAILED DESCRIPTION

The invention will be described in greater detail with reference to the FIGURE, which shows the operation of a process according to the invention.

An air separation unit ASU, which may be a cryogenic distillation unit, receives cooled, compressed and purified air 1 as feed gas. The air is then separated to form nitrogen 3 and an oxygen rich gas 5 containing at least 75% mol oxygen, preferably at least 80% mol. oxygen. The conduit means for transporting the oxygen rich gas is designed such that it is possible to divide oxygen rich gas 5 into a first oxygen rich gas stream 7 and a second oxygen rich gas stream 9, this division means being showing schematically as valves V1, V2.

During a first period, the valves V1 and V2 are open and the oxygen rich gas is divided into two streams. The first stream 7 may have a flowrate at least twice that of the second stream 9. The first stream 7 is sent to a first unit C1, as sole oxidant. Oxygen recirculated in the flue gas is not considered as an oxidant. The first unit C1 is also fed by fuel F1, which may be coal or natural gas.

The first unit may be a unit for the generation of electricity. It may be an IGCC unit, a gasification unit or an oxycombustion unit.

The first unit produces heat which is used to generate electricity. It also produces a first carbon dioxide containing gas, often known as flue gas, 11. This flue gas is divided in two, part 15 of the gas being sent back to the first unit C1, where the first unit is an oxycombustion unit. The remainder 13, if any, of the flue gas, may either be released into the atmosphere, treated to remove impurities, in particular carbon dioxide or used in another process.

It is possible that the recycled gas 15 may have been derived from the flue gas by treatment of some sort, e.g. to remove impurities, dust etc.

The second stream of oxygen rich gas 9 is sent, during the first period, to a second unit C2 which is also fed by air 21, in some cases. The oxygen rich gas may be sent directly to the second unit C2 (at boiler primary and/or secondary and/or burners) or may be mixed with the air 21 upstream of the unit C2 as shown in dashed lines (at boiler primary and/or secondary and/or burners). The unit C2 is a combustion unit and is fed with fuel F2 which may be coal or natural gas.

The oxygen and air purities and flowrates are chosen such that if streams 9 and 21 were (or are) mixed, the resultant gas would contain between 21% and 40% mol, preferably between 21 and 35% and preferable again between 21% and 27% on a dry basis. It will thus be understood that the flowrate of second oxygen rich gas stream 9 is substantially less than that of first air stream 21 (for example lower than 35%, preferably 24%, preferably 10% of the first air stream 21).

During the second period, the first unit C1 operates as in the first period with oxygen rich gas constituting the sole oxidant and with recycling of at least part of the flue gas.

However during the second period, either no oxygen rich gas is sent to second unit C2, or else the amount of oxygen rich gas sent to the second unit is substantially reduced, for example to at most of half of the flowrate during the first period.

Thus the second unit C2 is fed only with air as sole oxidant or else with a mixture of air and oxygen enriched gas, the resultant mixture being less rich in oxygen than in the first period.

In the case where the air is fed to the second unit during the first period, the flowrate of air 21 sent during the first period may be substantially less than that sent during the second period.

The process may be used for example under the following circumstances.

In the case where the second unit C2 operates normally using only air 21 as sole oxidant, if the part of the air ventilators break down or part of the air flow is interrupted for any reason, the second unit C2 may continue to operate using second oxygen rich gas stream 9 as complementary oxidant. If the air flowrate is only reduced rather than interrupted completely, the oxygen rich gas may compensate at least partially for the lack of oxygen supplied to the combustion.

Another possibility is to send the oxygen rich gas to the second unit C2 only when the unit C2 is operating at a high production rate. In this case, the sending of oxygen rich gas to the unit C2 may be conditioned by the amount of fuel F2 being sent to the unit C2, since the unit consumes more fuel as the production rate increases. Thus the first period corresponds to the case where the amount of fuel supplied is higher than a given threshold and the second period corresponds to the case where the amount of fuel supplied is lower than that threshold. Means for measuring the fuel flowrate (FIC) and for transmitting this information to valve V2 are shown in the FIGURE. A suggested threshold could be a value of 90% or 95% of the maximum fuel flow.

Another possibility would be to send the oxygen rich gas 9 to the second unit only in the case where the average cost of electricity is above a given threshold. Thus no oxygen rich gas 9 is sent to the second unit C2 when the cost of electricity is below the threshold, for example 50C/MWh. Alternatively less oxygen rich gas may be sent to the second unit when the price is below the threshold and more oxygen rich gas when the price is above the threshold. The operation of C2 using oxygen rich gas then becomes economically justified.

Another possibility is to send the oxygen rich gas to the second unit C2 only when the unit C2 is operating with low calorific value fuel or a biomass-based fuel. In this case, the sending of oxygen rich gas to the unit C2 may be conditioned by the lower heating value, the fuel preparation or combustion properties of the biomass-based fuel since they may impact the unit's flame stability, thermal efficiency, power output or production availability. Thus the first period may correspond to the case where the lower heating value of fuel F2 supplied is lower than a given threshold and the second period may correspond to the case where the lower heating value of fuel F2 supplied is higher than that threshold. Additionally or alternatively, the unit C2 may be fed by a fuel containing biomass and non-biomass. The first period may then correspond to the case where the proportion of biomass is higher than a given threshold (for example 15%) and the second period correspond to the case where the proportion of biomass is lower than that threshold or even zero.

In another example, when the flowrate of air 1 to the air separation unit ASU becomes particularly low, it may be impossible for the air separation unit to function correctly, unless compressed air and/or product gas is sent to the atmosphere. To avoid this waste, it may be useful to send oxygen rich gas to the second unit C2 only when the feed flow of air 1 to the air separation unit is below a given threshold. Thus when the feed flow is above the threshold, all the oxygen rich gas is sent to the first unit C1. In this case, the threshold could for example be when the flowrate falls below 75% of the design flowrate of the air separation unit.

The ASU may include a "bascule" system which stores liquid oxygen during the second period and vaporises this oxygen during the first period to produce product gaseous oxygen.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for providing an oxygen rich gas and fuel to at least first and second units, both of which are oxygen rich gas consuming units, the process comprising the steps of:
   i) separating air in an air separation unit (ASU) to produce oxygen rich gas;
   ii) during a first and a second period of time:
      sending a first oxygen rich gas stream from the ASU to the first unit,
      sending a first fuel stream to the first unit,
      removing a first carbon dioxide containing gas from the first unit, the first unit being integrated with a system for the generation of electricity;
   iii) during the first period of time:
      sending a second oxygen rich gas stream from the ASU to the second unit, the second unit being a combustion unit,
      supplying at least a second fuel stream and a first air stream to the combustion unit during the first period,
      removing a second carbon dioxide containing gas from the second unit without sending any of the second carbon dioxide containing gas or any gas derived therefrom back to the second unit; and
   iv) during the second period of time:
      supplying at least a second air stream and a third fuel stream to the combustion unit, and
      removing a third carbon dioxide containing gas from the second unit without sending any of the third carbon dioxide containing gas back to the second unit,
   wherein during the second period of time, one or more of the following steps is conducted:
   (1) no oxygen rich gas is sent from the air separation to the second unit; and
   (2) a third oxygen rich gas stream at least 50% less than the second oxygen rich gas stream is sent from ASU to the second unit.

2. The process as claimed in claim 1, wherein during the first and second period of time, the process further comprises the step of sending at least part of the first carbon dioxide containing gas or a gas derived therefrom back to the first unit.

3. The process as claimed in claim 1, wherein the first air stream is supplied to the second unit during the first period and the second air stream is supplied to the second unit during the second period, the flow rate of the first air stream being at least 50% less than the flow rate of the second air stream.

4. The process as claimed in claim 1, wherein the flow rate of the first oxygen rich gas stream is greater than the flow rate of the second oxygen rich gas stream.

5. The process as claimed in claim 1, wherein during the first period, the second oxygen rich gas stream is mixed with air to be supplied to the combustion unit or sent directly to the second unit without having been mixed with air being supplied to the combustion unit.

6. The process as claimed in claim 1, wherein the first period corresponds to a period when there is a partial interruption to the sending of air to the second unit.

7. The process as claimed in claim 1, wherein during the first period, the average price of electricity is above a given threshold and during the second period, the average price of electricity is below a given threshold.

8. The process as claimed in claim 1, wherein during the first period, the combustion unit operates with a fuel having a lower heating value below a given threshold and during the second period, the combustion unit operates with a fuel having a lower heating value above the given threshold.

9. The process as claimed in claim 1, wherein during the first period, the combustion unit operates with fuel having a biomass content above a given threshold and during the second period, the combustion unit operates with fuel having a biomass content below a given threshold.

10. The process as claimed in claim 1, wherein the ASU receives a feed flow of compressed, cooled and purified air to be distilled and during the first period, the ASU is operating with a feed flow below a given threshold and during the second period, the ASU is operating with a feed flow below the given threshold.

11. The process as claimed in claim 1, wherein the flow rate of the second fuel stream is greater than the flow rate of the third fuel stream.

12. The process as claimed in claim 1, wherein the first air stream and the second oxygen rich gas stream have purities and flow rates such that the oxygen purity in a gas formed by mixing the first air stream and the second oxygen rich gas stream would be between 21% and 40% mol. on a dry basis.

13. The process as claimed in claim 1, wherein the flow rate of the first oxygen rich gas stream during the first and second periods is at least twice that of the second oxygen rich gas stream during the first period.

14. The process as claimed in claim 1, wherein the first carbon dioxide containing gas contains at least 70% carbon dioxide on a dry basis and the second carbon dioxide containing gas contains at most 30% carbon dioxide on a dry basis.

15. The process as claimed in claim 1, wherein the ASU produces and stores oxygen enriched liquid during second period and wherein at least part of said oxygen enriched liquid stored during the second period is vaporized during the first period to produce at least part of the second oxygen rich gas stream.

* * * * *